(12) United States Patent
Hsu

(10) Patent No.: US 9,647,451 B2
(45) Date of Patent: May 9, 2017

(54) DISCHARGE CIRCUIT

(71) Applicant: ASIAN POWER DEVICES INC., Taoyuan, Taoyuan County (TW)

(72) Inventor: Chih-Yuan Hsu, Taoyuan (TW)

(73) Assignee: ASIAN POWER DEVICES, INC., Taoyuan (TW)

(*) Notice: Subject to any disclaimer, the term of this patent is extended or adjusted under 35 U.S.C. 154(b) by 51 days.

(21) Appl. No.: 14/802,822

(22) Filed: Jul. 17, 2015

(65) Prior Publication Data

US 2016/0072272 A1 Mar. 10, 2016

(30) Foreign Application Priority Data

Sep. 4, 2014 (TW) .............................. 103130847 A

(51) Int. Cl.
*H02H 3/20* (2006.01)
*H02H 9/04* (2006.01)
*H02M 1/32* (2007.01)

(52) U.S. Cl.
CPC ...... *H02H 9/041* (2013.01); *H02M 2001/322* (2013.01)

(58) Field of Classification Search
CPC .................................. H02H 9/04; H02H 9/041
USPC ............................................................ 361/56
See application file for complete search history.

(56) References Cited

U.S. PATENT DOCUMENTS 5,400,202 A * 3/1995 Metz .................. H01L 27/0251
361/111

* cited by examiner

*Primary Examiner* — Dharti Patel
(74) *Attorney, Agent, or Firm* — Muncy, Geissler, Olds & Lowe, P.C.

(57) ABSTRACT

A discharge circuit includes a discharge switch trigger unit, a discharge switch unit and a discharge resistor unit. The discharge switch unit is coupled connected to the discharge switch trigger unit. The discharge resistor unit is coupled connected to the discharge switch unit. The discharge switch trigger unit and the discharge resistor unit are coupled connected to a voltage output side. When the output voltage of a power supply reaches a predetermined rated limitation, an over voltage protection circuit is activated, and the discharge switch unit is turned on by the discharge switch trigger unit, then the output voltage starts to decrease through the discharge resistor unit.

4 Claims, 1 Drawing Sheet

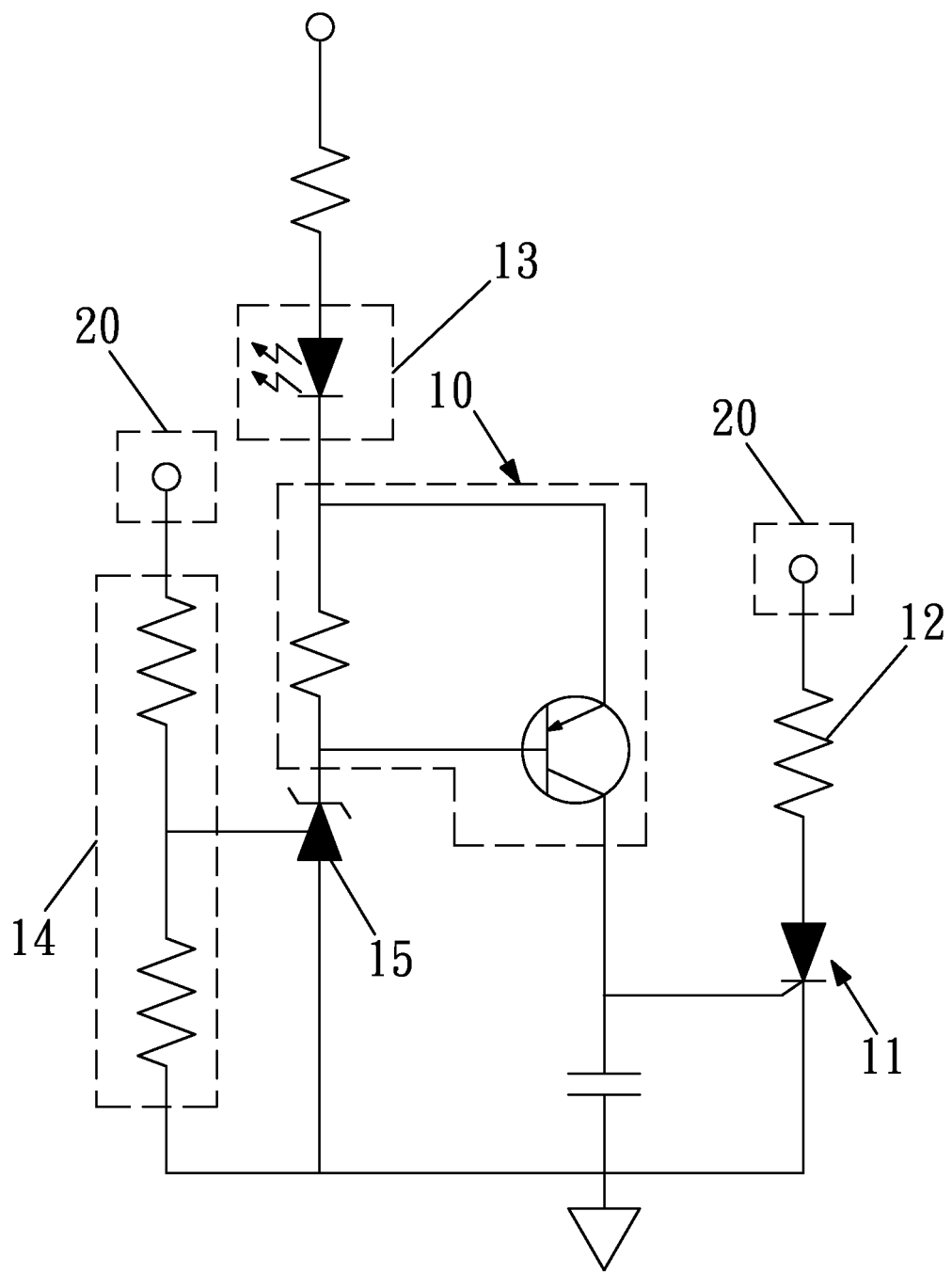

DISCHARGE CIRCUIT

BACKGROUND OF THE INVENTION

Field of the Invention

The present invention relates to a discharge circuit, and especially relates to a circuit structure which is able to reduce circuit system loss.

Description of the Related Art

Semiconductor technologies are growing quickly, so that computers and peripherals are growing quickly as well. Power of integrated circuits (abbreviation as IC) applied to computers and peripherals are variously manufactured due to various power requirements. In order to satisfy various power requirements, the pulse width modulation regulators of the boost converter and the buck converter and so on are provided. This is one of the very important factors for providing various digital products.

In the abnormal condition, the output voltage of the pulse width modulator may exceed the rated limitation, so that the end-system which is powered by the power supply might be broken. Therefore, usually the over voltage protection (abbreviation as OVP) circuit is provided, so that the pulse width modulation regulator stops working to avoid the end-system from being broken when the output voltage exceeds the rated limitation.

A conventional over voltage protection circuit comprises a detection circuit arranged at the voltage output side of the pulse width modulator. The pulse width modulator stops working immediately when the detection circuit detects that the output voltage is too high.

A conventional output discharge circuit is to arrange a specific resistance at PSU output stage as a minimum load to speed up the discharge speed when OVP is triggered. Due to PSU's output voltage regulation needs, several hundred to thousands micro farad electrolytic capacitors are applied at the voltage output side of the power supply. When the load of voltage output side is at light or no load condition, the output voltage has to wait for a long period to go within the safe range after PSU stops working. However, the period is related to the capacitor capacitance. Somebody may be hurt if he/she touches the output voltage accidentally before the output voltage goes within the safe range. Nevertheless, power conversion efficiency is reduced because resistive loss exists at the voltage output side of the power supply.

Therefore, in order to solve the above-mentioned problems, a solution is provided.

SUMMARY OF THE INVENTION

In order to solve the above-mentioned problems, an object of the present invention is to provide a discharge circuit. When PSU output voltage does not reach the over voltage protection level, the discharge resistor unit for speeding up discharging process will not be activated to induce loss on the system.

In order to achieve the object of the present invention mentioned above, the discharge circuit comprises a discharge switch trigger unit, a discharge switch unit and a discharge resistor unit. The discharge switch unit is coupled connected to the discharge switch trigger unit. The discharge resistor unit is coupled connected to the discharge switch unit. The discharge switch trigger unit and the discharge resistor unit are coupled connected to a voltage output side. When the output voltage of a power supply reaches a predetermined rated limitation, an over voltage protection circuit is activated, and the discharge switch unit is turned on through the discharge switch trigger unit, then the output voltage starts to decrease through the discharge resistor unit.

In conclusion, according to the circuit design and the related components of the present invention, when the output voltage of the power supply does not reach the over voltage protection, unnecessary loss can be avoided.

BRIEF DESCRIPTION OF DRAWING

The FIGURE shows a circuit diagram of a preferred embodiment of the present invention.

DETAILED DESCRIPTION OF THE INVENTION

In order to understand the purposes, characteristics and advantages of the present invention mentioned above, a preferred embodiment is provided as following. Please refer to the FIGURE and the detailed descriptions are as following.

The FIGURE shows a circuit diagram of a preferred embodiment of the present invention. A discharge circuit of the present invention comprises a discharge switch trigger unit 10, a discharge switch unit 11 and a discharge resistor unit 12. The discharge switch unit 11 is coupled connected to the discharge switch trigger unit 10. The discharge resistor unit 12 is coupled connected to the discharge switch unit 11. The discharge switch trigger unit 10 and the discharge resistor unit 12 are coupled connected to a voltage output side 20. The voltage output side 20 is the voltage output of a power supply.

Moreover, the discharge switch trigger unit 10 can be a transistor (this embodiment shows a PNP transistor) or a component featuring the same function. The discharge switch unit 11 can be a thyristor (SCR) or a component featuring the same function. In this embodiment, the discharge switch trigger unit 10 is coupled connected to a control unit 13. The purpose of the control unit 13 is to stop the power supply to perform over voltage protection. In this embodiment, the control unit 13 is, for example but not limited to, a photo coupler.

Moreover, a voltage-dividing resistor 14 and a voltage control switch 15 can be further arranged between the discharge switch trigger unit 10 and the voltage output side 20. The voltage control switch 15 is turned on when the voltage-dividing resistor 14 detects that the voltage output side 20 reaches over voltage condition. A current flows through the control unit 13 so that a PWM IC (not shown in the FIGURE) stops working to avoid the voltage on the voltage output side 20 of a power supply exceeds a rated limitation value. In this embodiment, the voltage control switch 15 can be a TL431 or a component featuring the same function.

When the voltage on the voltage output side 20 reaches a rated limitation value, the voltage-dividing resistor 14 detects the over voltage status and then triggers the voltage control switch 15, so that a current flows through the control unit 13 and couples a signal to stop the IC. This process results that the discharge switch trigger unit 10 to be activated and the discharge switch unit 11 to be turned on. When the discharge switch unit 11 is turned on, the discharge resistor unit 12 is connected to a ground, so that the electric power on the voltage output side 20 is discharged through the discharge resistor unit 12.

As mentioned above, after the control unit 13 is triggered, the control unit 13 sends a control signal to the PWM IC (not shown in the FIGURE), so that the power supply stops working and cannot supply energy to the voltage output side 20, and the electric power on the voltage output side 20 is discharged through the discharge resistor unit 12 and reduced gradually. When the output voltage on the voltage output side 20 does not exceed the rated limitation value, the discharge switch unit 11 is in off status. Once the discharge switch unit 11 is turned on due to over voltage protection, the only way to turn off the discharge switch unit 11 is to wait the output voltage on the voltage output side 20 to be exhausted. Moreover, the resistance value of the discharge resistor unit 12 can be changed to adjust the discharge speed.

According to the circuit structure of the present invention, the main features are that when the power supply is not in the over voltage condition, the loop of the discharge resistor unit 12 is open. Therefore, unlike the conventional circuit which causes excess power loss in the normal condition, the overall efficiency of the present invention is improved.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A discharge circuit comprising:
   a discharge switch trigger unit coupled connected to a voltage output side and a control unit, and a voltage control switch arranged between the discharge switch trigger unit and the voltage output side;
   a discharge switch unit coupled connected to the discharge switch trigger unit; and
   a discharge resistor unit, one side of the discharge resistor unit coupled connected to the discharge switch unit, the other side of the discharge resistor unit coupled connected to the voltage output side,
   wherein when a voltage on the voltage output side exceeds a predetermined value, an over voltage status is detected to trigger the voltage control switch, so that a current flows through the control unit and couples a signal through a photo coupler to stop a pwm ic working to avoid the voltage output side exceeding a rated limitation value; the current flowing through the control unit results that the discharge switch trigger unit is activated to activate the discharge switch unit to be turned on, and an output voltage on the voltage output side is discharged through the discharge resistor unit and reduced gradually; then the output voltage on the voltage output side goes below the predetermined value, the discharge switch unit is only turned off when there is no voltage on the voltage output side once the discharge switch unit is activated.

2. The discharge circuit in claim 1, wherein the discharge switch trigger unit is a transistor.

3. The discharge circuit in claim 2, wherein the discharge switch unit is a thyristor (SCR).

4. The discharge circuit in claim 3, wherein a voltage-dividing resistor is arranged between the discharge switch trigger unit and the voltage output side.

\* \* \* \* \*